United States Patent [19]
Longree

[11] Patent Number: 6,070,881
[45] Date of Patent: Jun. 6, 2000

[54] CONFIGURATION FOR SEALING A LEADTHROUGH GAP BETWEEN A WALL AND A SHAFT

[75] Inventor: Alexander Longree, Köln, Germany

[73] Assignee: Siemens Aktiengesellschaft, Munich, Germany

[21] Appl. No.: 09/093,570

[22] Filed: Jun. 8, 1998

Related U.S. Application Data

[63] Continuation of application No. PCT/DE96/02263, Nov. 25, 1996.

[30] Foreign Application Priority Data

Dec. 8, 1995 [DE] Germany .......................... 195 45 732

[51] Int. Cl.⁷ ...................................................... F16J 15/40
[52] U.S. Cl. .......................... 277/409; 277/411; 277/431; 277/579; 277/931
[58] Field of Search ..................................... 277/409, 411, 277/422, 430, 431, 432, 579, 580, 582, 931

[56] References Cited

U.S. PATENT DOCUMENTS

| | | | |
|---|---|---|---|
| 3,047,299 | 7/1962 | Karsten | 277/422 |
| 3,190,661 | 6/1965 | Wahl et al. | |
| 3,999,766 | 12/1976 | Barton | 277/432 |
| 4,076,259 | 2/1978 | Raimondi | |
| 4,153,259 | 5/1979 | Torstensson | |
| 4,305,592 | 12/1981 | Peterson | 277/430 |
| 4,486,024 | 12/1984 | Cooper | 277/422 |
| 4,534,569 | 8/1985 | Ishitani et al. | 277/351 |
| 4,579,349 | 4/1986 | Pipich et al. | 277/422 |
| 4,815,748 | 3/1989 | Schubert | 277/422 |
| 5,015,000 | 5/1991 | Perini | 277/422 |
| 5,147,015 | 9/1992 | Snuttjer | 184/6.22 |
| 5,233,862 | 8/1993 | Longree | |

FOREIGN PATENT DOCUMENTS

| | | | |
|---|---|---|---|
| 0 542 751 B1 | 5/1993 | European Pat. Off. | |
| 1109866 | 2/1956 | France | 277/432 |
| 2320400 | 10/1974 | Germany | 277/432 |
| 25 54 037 | 6/1977 | Germany | |
| 37 23 943 A1 | 10/1988 | Germany | |
| 37 23 729 A1 | 1/1989 | Germany | |
| 42 02 271 A1 | 7/1992 | Germany | |
| 4-266666 | 9/1992 | Japan | |
| 626 694 | 11/1981 | Switzerland | |
| 934107 | 6/1982 | U.S.S.R. | 277/422 |
| 1295116 | 3/1987 | U.S.S.R. | 277/422 |
| 2081821 | 2/1982 | United Kingdom | 277/409 |

*Primary Examiner*—Anthony Knight
*Assistant Examiner*—Alison K. Pickard
*Attorney, Agent, or Firm*—Herbert L. Lerner; Laurence A. Greenberg; Werner H. Stemer

[57] ABSTRACT

A configuration seals a leadthrough gap between a wall and a shaft which is passed through the wall and can be set in rotation relative to the wall. The configuration has a sealing ring through which the shaft can be passed as well as a holder that can be firmly connected to the wall and has a cylindrical recess and a groove opening into the recess. The groove has a first groove surface and a second groove surface, between which the sealing ring is held while leaving respective radial gaps as well as a chamber that surrounds the sealing ring and can be filled with oil. The radial gap at the first groove surface is blocked to prevent a throughflow of oil from the chamber. The configuration can be used in a sealing system for an electrical machine filled with hydrogen, in particular for a turbogenerator.

24 Claims, 5 Drawing Sheets

CONFIGURATION FOR SEALING A LEADTHROUGH GAP BETWEEN A WALL AND A SHAFT

CROSS-REFERENCE TO RELATED APPLICATION

This application is a continuation of International Application No. PCT/DE96/02263, filed Nov. 25, 1996, which designated the United States.

BACKGROUND OF THE INVENTION

Field of the Invention

The invention relates to a configuration for sealing a leadthrough gap between a wall and a shaft which is passed through the wall and can be set in rotation relative to the wall, including a sealing ring through which the shaft can be passed as well as a holder that can be firmly connected to the wall and has a cylindrical recess and a groove opening into the recess, the groove having a first groove surface and a second groove surface, between which the sealing ring is held, and a chamber that surrounds the sealing ring and can be filled with oil remaining in the groove.

Such a configuration is used, for example, on an electrical machine filled with hydrogen, in which the hydrogen is used in particular for cooling purposes. In that case, the configuration is used as part of a sealing system in order to seal a leadthrough of a rotatable shaft through a fixed casing of the machine and to prevent an escape of hydrogen into the surroundings of the machine. The use of the configuration on a large turbogenerator which is cooled solely with hydrogen or with hydrogen and water is of particular importance. Such a turbogenerator normally has a power output of 500 MVA and above and it has a sealed casing in which the hydrogen is under a pressure of $10^5$ Pa to $10^6$ Pa.

German Published, Non-Prosecuted Patent Application DE 37 23 729 A1 or UK Patent Application GB 0 760 781 A discloses a configuration of the type described at the outset above. Those documents also demonstrate possibilities for the further development of such a configuration. The first-mentioned document relates to the placemement of the sealing ring on a casing wall, in which case the sealing ring is not intended to be rotatable relative to the casing wall but to be easily displaceable for the purpose of centering. To that end, it is not disposed in a chamber but is held between the wall and a fastening plate by fastening bolts. Feed lines for oil are provided through the wall. In each case a line extension in the sealing ring is allocated to the feed lines. Each line extension leads into a corresponding annular groove in the sealing ring. The groove is to be allocated to the shaft to be sealed. Furthermore, an oil-leakage flow takes place at least to a limited extent between the sealing ring and the wall as well as between the sealing ring and the fastening plate. A sealing device, which is a lip seal, prevents larger quantities of oil from flowing off through a gap between the wall of the generator casing and the sealing ring. The pressure in the interior of the generator as well as the oil pressure load the sealing ring and press it against the fastening plate. In order to create a balance and to reduce the friction in gaps between the sealing ring and the fastening plate, annular relief oil grooves, to which oil can be fed, are provided in the fastening plate. The second-mentioned document in particular presents possibilities for feeding oil or another liquid for sealing and/or lubricating purposes to gaps between the sealing ring, the wall and the shaft.

A shaft seal for hydrogen-cooled turbogenerators is described in German Published, Non-Prosecuted Patent Application DE 37 12 943 A1, corresponding to U.S. Pat. No. 4,815,748. That shaft seal has a sealing configuration which is radially movable in a chamber and has two sealing rings enclosing the shaft, with at least one of the sealing rings being axially movable. Sealing oil is directed from the chamber to the shaft to be sealed through the use of a radial feed line which runs either through one sealing ring or between the two sealing rings. At least the second sealing ring has a radial line which is fluidically connected to a collecting space or a blind bore disposed in a surface of the chamber. In that way, some of the sealing-oil flow is diverted and fed back in the direction of the inner casing of the generator.

Swiss Patent 626 694, corresponding to U.S. Pat. No. 4,076,259, deals with a shaft seal, in particular for large compressor shafts. An annular gap remains between the shaft to be sealed and a sealing piston. The passing of the fluidic medium through that annular gap is to be restricted and throttled as far as possible by a helical groove cut in an inner wall of the sealing piston. The helical groove forms a labyrinth seal which, upon rotation of the shaft together with the labyrinth seal, produces a pumping action that prevents the sealing oil from penetrating into the interior of the compressor.

If a shaft having an increasing diameter is taken into account in the planning of a new turbogenerator, a problem arises from the fact that the dimensions of the gaps through which hydrogen could leak out of the casing of the turbogenerator along the shaft increase with the diameter of the shaft. As the demands on the sealing of the turbogenerator increase, that is reflected in the need to improve the sealing effect of a configuration of the type mentioned at the outset above. In many cases, an appropriate configuration is therefore often configured in such a way that it has two circuits for sealing oil which lie one behind the other along the shaft. In that case, a circuit facing the interior of the casing is intended to largely receive any leakages of hydrogen, and a circuit facing the exterior of the casing is intended to ensure that no air can penetrate into the casing. The outlay required to operate a configuration of such construction is very high, and accordingly the need has arisen to develop a configuration of the type mentioned at the outset above in such a way that it can be operated with a single circuit for sealing oil.

European Patent 0 542 751 B1, corresponding to U.S. Pat. No. 5,233,862, discloses a configuration for sealing a leadthrough gap between a casing wall and a shaft which is passed through the casing wall and can be set in rotation relative to the casing wall. In that configuration, the sealing ring, which slides on the rotating shaft without rotating with it, can be monitored in terms of its function. To that end, a torque which the rotating shaft exerts on the sealing ring is measured. If the torque exceeds a certain limit, it must be assumed that satisfactory lubrication of the sealing ring sliding on the shaft is no longer guaranteed and a problem is about to occur.

In the future it can be expected that an increasing pressure on the prices achievable on the market will require large dynamoelectrical machines to be simplified and reduced in price, in which case a leakage of hydrogen from a dynamo-electrical machine filled with hydrogen, which leakage can be tolerated operationally, will be increasingly less tolerable from the points of view of environmental protection and safety. Therefore, in a sealing system of the type described in the introduction, it is desirable to reduce the loading of the used oil with hydrogen to a minimum, which inevitably occurs when the oil comes in contact with the hydrogen.

Hydrogen which has penetrated into oil cannot be recovered or can only be recovered at considerable cleaning cost and cannot be fed back to the electrical machine, and a loss of at least some of that hydrogen can scarcely be avoided somehow or other.

It may be stated in that connection that, in a sealing system which has two circuits in the manner described above for the oil used for sealing, a considerable input of hydrogen into at least one of the circuits is always to be expected. In view of the considerations referred to in the previous paragraph, it is therefore desirable to dispense with such sealing systems in the future and to manage with sealing systems having a single circuit for the oil in each case.

SUMMARY OF THE INVENTION

It is accordingly an object of the invention to provide a configuration for sealing a leadthrough gap between a wall and a shaft that is passed through the wall and can be set in rotation relative to the wall, which overcomes the hereinafore-mentioned disadvantages of the heretofore-known devices of this general type, and in which an input of hydrogen from a casing filled with hydrogen into oil that flows through the configuration is avoided as far as possible.

With the foregoing and other objects in view there is provided, in accordance with the invention, a configuration for sealing a leadthrough gap between a wall and a shaft passing through the wall for rotation relative to the wall, comprising a sealing ring having a sealing surface facing the shaft to be passed through the sealing ring, the sealing ring containing at least one line; a holder to be firmly connected to the wall, the holder having a cylindrical recess, a groove opening into the cylindrical recess and defining a first groove surface or flank and a second groove surface or flank for holding the sealing ring between the surfaces, the first groove surface having an annular groove, and a chamber surrounding the sealing ring, the chamber to be filled with oil remaining in the groove and directed out of the chamber through the at least one line to the sealing surface; an annular seal held in the an annular groove; and a branch line communicating between the annular groove and the chamber.

In accordance with another feature of the invention, the seal is made of a material having a low coefficient of friction, in particular polytetrafluorethylen, such as TEFLON, which is a trademark of Dupont.

Such a configuration is used in a sealing system for an electrical machine in such a way that the first groove surface faces the interior of the casing so that hydrogen to be screened from the exterior of the casing is in contact with this first groove surface. The chamber is filled with the oil used for the sealing. The oil penetrates into the existing radial gaps between the holder and the sealing ring. Due to the fact that the radial gap is blocked by the annular seal at the first groove surface to prevent a throughflow of the oil, oil from a radial gap can no longer reach the interior of the casing and thereby become saturated with hydrogen, as was always the case in the configurations according to the teachings of the prior art. The annular seal is pressed onto the sealing ring by oil which acts on the annular seal from the chamber through the branch line and the annular groove. In this way, the quantity of oil flowing into the generator is significantly reduced, in which case the outlay on equipment remains quite small and in particular only structural measures are required in the immediate vicinity of the sealing ring.

With the objects of the invention in view, there is also provided a configuration for sealing a leadthrough gap between a wall and a shaft passing through the wall for rotation relative to the wall, comprising a sealing ring having a sealing surface facing the shaft to be passed through the sealing ring, the sealing ring containing at least one line; and a holder to be firmly connected to the wall, the holder having a cylindrical recess, a groove opening into the cylindrical recess and defining a first groove surface or flank and a second groove surface or flank for holding the sealing ring between the surfaces, and a chamber surrounding the sealing ring, the chamber to be filled with oil remaining in the groove and directed out of the chamber through the at least one line to the sealing surface; the sealing ring having a collecting chamber, a surface directly facing the first groove surface, and a discharge line disposed between the at least one line and the surface directly facing the first groove surface, the discharge line connected from the sealing surface to the collecting chamber for admitting oil to the collecting chamber.

In accordance with a further feature of the invention, the collecting chamber is connected to a discharge for the oil accumulating therein. Within the scope of such a development, oil which has heated up at the sealing surface due to friction between the sealing ring and the rotating shaft can enter the collecting chamber and heat the sealing ring there. Thus, substantially more uniform heating of the sealing ring results than could be the case without such a development. This first of all prevents the development of thermal stresses in the sealing ring in particular. However, in this way the sealing ring can follow a shaft expansion, likewise caused by heating, by virtue of the fact that it expands itself. A gap between the sealing ring and the shaft can therefore be kept relatively small in both the cold and warmed-up state. It is no longer necessary to dimension the sealing ring in such a way that it in turn maintains a distance from the warmed-up shaft when still in the cold state, which means that the gap between the sealing ring and the shaft has to be quite large in the cold state and a very high throughflow of oil is therefore required for the sealing. Thus a clear reduction in the quantity of sealing oil flowing into the generator is thereby achieved.

When oil flows through the line, a gap which is located between the shaft and the sealing ring and is defined on the side of the sealing ring by the sealing surface, can be completely filled with oil and can thus be reliably blocked to prevent a throughflow of hydrogen.

In accordance with an added feature of the invention, the line leads into an annular groove in the sealing surface of the sealing ring, since a uniform distribution of the oil is thereby ensured.

In accordance with an additional feature of the invention, the oil between the shaft and the sealing ring is discharged through a second annular groove in the sealing ring, and the second annular groove is connected to the discharge line.

In accordance with yet another feature of the invention, in order to limit the discharge of oil along the sealing surface of the sealing ring in a direction towards the first groove surface, the sealing surface has a channel helically encircling it between the annular groove and a surface of the sealing ring, and the surface bears directly against the first groove surface. This channel is expediently oriented in such a way that oil which is located in the channel is delivered from the rotating shaft towards the annular groove. In this case, an impulse directed towards the annular groove is superimposed on the oil in the channel by the rotating shaft, and the impulse counteracts an excessive discharge of oil away from the annular groove and towards the first groove surface.

In accordance with yet a further feature of the invention, the sealing ring has an annular extension on a surface which bears directly against the first groove surface, and the annular extension extends the sealing surface. The gap between the annular groove and the surface of the sealing ring is also extended by the extension of the sealing surface. This increases the resistance which the gap offers to oil flowing through and likewise limits the discharge of oil along the sealing surface.

In accordance with yet an added feature of the invention, the second groove surface has an annular groove to which oil can be admitted. The second groove surface is that groove surface which would have to be turned towards the exterior of the casing when using the configuration in an electrical machine filled with hydrogen. During the operation of the configuration, oil is admitted to this annular groove, which oil is under such a high pressure that it exerts a force on the sealing ring, which force is exerted on the sealing ring by the hydrogen, under increased pressure according to conventional practice, in the interior of the casing. In this way, the sealing ring is held essentially free of force, which is favorable for the operation and the function of the sealing ring.

In accordance with yet an additional feature of the invention, an annular groove is provided in the first groove surface, and a discharge for discharging oil from the corresponding radial gap can be connected to that annular groove. In this case, oil flows through the radial gap at the first groove surface, although such oil flowing through does not pass to the shaft and thus into the interior of the casing but is discharged beforehand. Therefore, this oil cannot be substantially laden with hydrogen, so that the object of the invention is also achieved in this way. Any possible increased outlay on equipment is offset by an altogether more interesting advantage, namely the possibility of being able to influence the operation of the sealing ring and to control the discharge of the oil from the radial gap at the first groove surface.

In accordance with again another feature of the invention, the configuration is fitted in a sealing system on an electrical machine, in particular on a turbogenerator filled with hydrogen. The configuration limits the overflow of hydrogen into the oil, since it blocks at least one location to prevent a throughflow of oil. An inflow of oil into the interior of the sealed machine is not absolutely necessary at that location. Leakage of hydrogen is therefore avoided to a considerable extent, which makes it substantially easier to fulfill relevant operating regulations.

In accordance with a concomitant feature of the invention, the sealing system contains only a single circuit for the oil.

Other features which are considered as characteristic for the invention are set forth in the appended claims.

Although the invention is illustrated and described herein as embodied in a configuration for sealing a leadthrough gap between a wall and a shaft, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
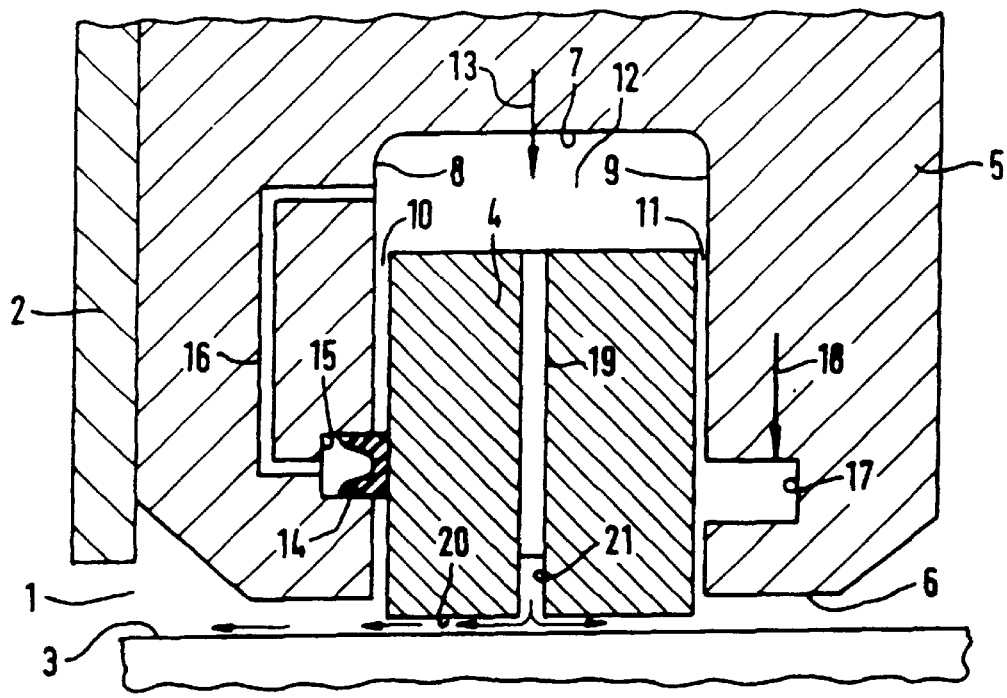
FIG. 1 is a fragmentary, diagrammatic, longitudinal-sectional view of a first embodiment of a configuration according to the invention.

With reference to the drawings as a whole, it is not asserted that the drawings represent certain true-to-scale exemplary embodiments. Complementary information for realizing an exemplary embodiment can be gathered from the relevant prior art. Each figure of the drawing shows a longitudinal section through a respective embodiment along an axis of the shaft, the leadthrough of which through a casing is to be sealed.

It is also noted that in the figures, parts and features corresponding to one another have the same reference numerals and that features which are more or less generally present are treated with reference to FIG. 1 for all of the other figures.

Referring now to the figures of the drawings in detail and first, particularly, to FIG. 1 thereof, there is seen a configuration for sealing a leadthrough gap 1 between a wall 2 and a shaft 3 which is passed through the wall 2 and can be set in rotation relative to the wall 2. The configuration includes a sealing ring 4 through which the shaft 3 passes as well as a holder 5 firmly connected to the wall 2. The holder 5 has a cylindrical recess 6 through which the shaft 3 passes and a groove 7 opening into this recess 6. This groove 7 is defined along the shaft 3 by a first groove surface 8 and a second groove surface 9, and the sealing ring 4 is held between these groove surfaces 8 and 9 while leaving respective radial gaps 10 and 11. The radial gaps 10, 11 are not shown to scale and more particularly they are enlarged. In this case, a chamber 12 surrounding the sealing ring 4 remains free in the groove 7. The chamber 12 can be filled with oil through a corresponding feed 13, which is only shown as an arrow for the sake of clarity. The oil reaches the leadthrough gap 1 in order to seal the latter.

The wall 2 belongs to a casing of a turbogenerator filled with hydrogen, and the configuration is intended to prevent hydrogen from flowing off through the leadthrough gap 1. This is effected with the aid of the sealing ring 4 and the oil, which is intended to fill all gaps remaining in the configuration. However, as already explained, in the process the oil becomes at least partly enriched with hydrogen, and the hydrogen has to be removed again from the oil. This means that there must be a corresponding outlay for equipment, and this also means that a certain loss of hydrogen has to be expected. In order to remove those problems, it is thus important to limit the inflow of oil in the direction of the wall 2, where the oil could become enriched with hydrogen, and of course to do so while maintaining the function of the sealing ring 4.

The oil from the chamber 12 penetrates in particular into the radial gaps 10 and 11, in the course of which it could flow through the radial gap 10 at the first groove surface 8 in the direction of the wall 2 and come in contact with hydrogen. In order to prevent this, the radial gap 10 is blocked to prevent oil from flowing through from the chamber 12. Within the scope of the embodiment described herein, this is effected by an annular seal 14 surrounding the shaft 3 and provided in the radial gap 10. This annular seal 14 is made, for example, of TEFLON or an elastomeric material of a known type which is resistant to oil. The annular seal 14 lies in an annular groove 15 in the holder 5. The annular groove 15 communicates with the chamber 12 through a branch line 16. The pressurized oil in the chamber 12 therefore exerts a pressure on the annular seal 14 in such a way that the annular seal 14 is pressed against the sealing ring 4 and reliably seals the annular gap 10.

An annular groove 17 is likewise located in the second groove surface 9, which faces the exterior of the casing and thus the air. Oil can likewise be fed to this annular groove 17 through a feed 18, which again is only shown as an arrow for the sake of clarity. This oil serves to compensate for a force exerted on the sealing ring 4 by the pressurized hydrogen along the shaft 3 and to hold the sealing ring 4 free of force in the holder 5. In this way, the friction of the sealing ring 4 on the groove surfaces 8 and 9 is restricted to a minimum and the function of the sealing ring 4 is ensured.

The sealing ring 4 contains a line 19 through which oil can be directed from the chamber 12 to a sealing surface 20 of the sealing ring 4. The sealing surface 20 faces the shaft 3. In this way, two oil flows flowing in opposite directions to one another (shown by arrows) are formed between the sealing surface 20 and the shaft 3. The oil flows reliably prevent hydrogen or air from being able to penetrate between the sealing ring 4 and the shaft 3. In order to provide uniform distribution, an annular groove 21 into which the line 19 leads is provided in the sealing surface.

Figure 2:
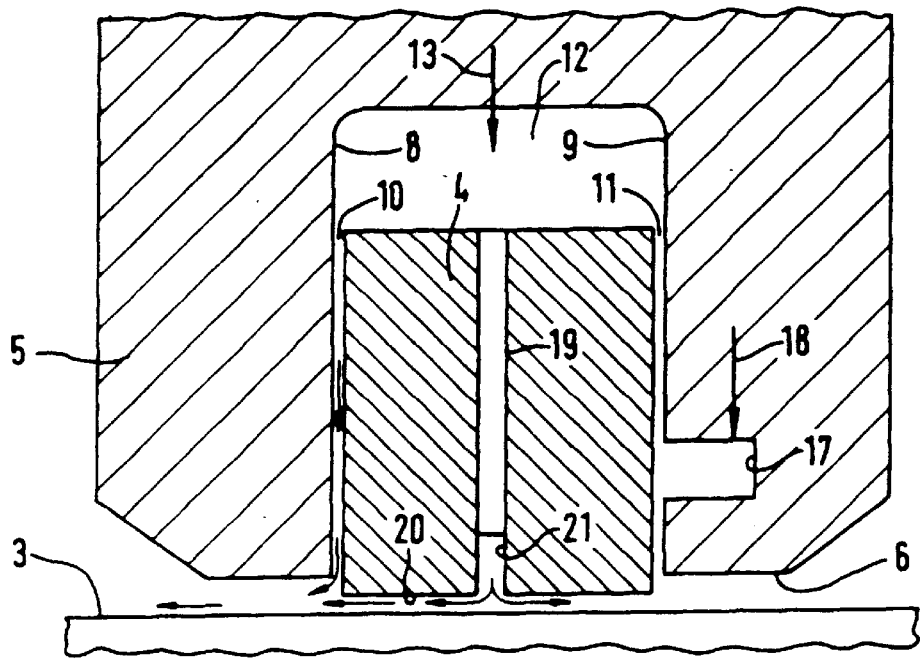
FIG. 2 is a fragmentary, longitudinal-sectional view of a structure according to the prior art.

FIG. 2 shows a configuration disclosed by the prior art for sealing a leadthrough gap 1. As is clearly recognizable, in that configuration oil can flow unhindered from the chamber 12 through the annular gap 10 and that oil, together with oil flowing along the sealing surface 20, passes between the shaft 3 and the holder 5 to that side which is exposed to the interior of the sealed casing and thus to the hydrogen. Thus a considerable accumulation of oil enriched with hydrogen occurs. Since the configuration has only a single circuit for the oil, the oil enriched with hydrogen must ultimately be brought together with oil which has flowed to the other side of the holder 5 and has become enriched with air. A mixture of air and hydrogen which is thus obtained by degassing of the oil has to be dissociated in a relatively expensive manner if the hydrogen is to be recovered. Alternatively, the gas mixture has to be disposed of as exhaust gas, although that could possibly cause difficulties in complying with relevant regulations. Separate guidance and degassing of the oil enriched with hydrogen may of course also be provided in the circuit for the oil. However, that makes the circuit quite complicated and only partly removes the problems to be dealt with, since hydrogen cannot even be extracted from that oil to an acceptable degree of purity without considerable expense.

Figure 3:
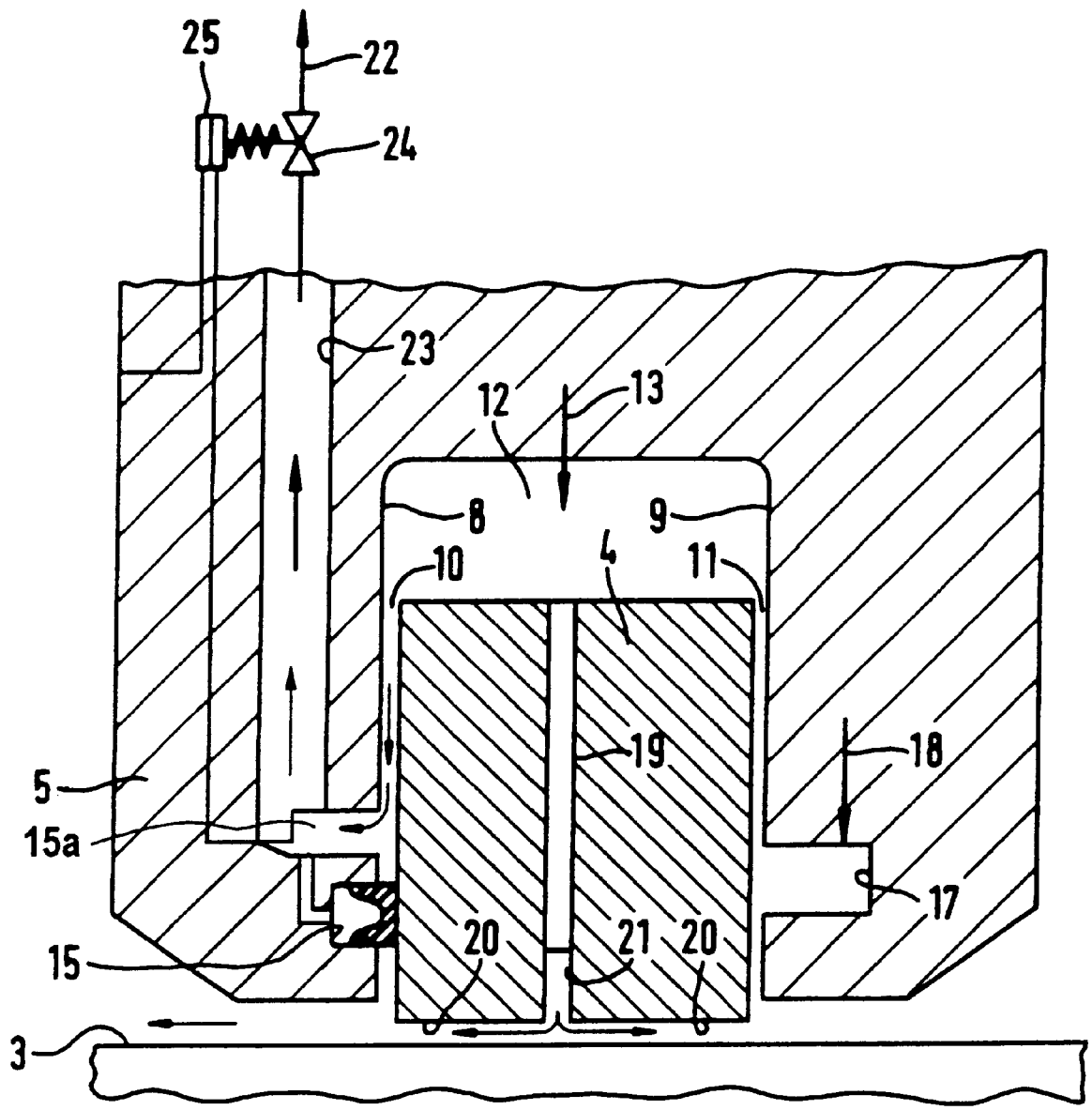
FIG. 3 is a fragmentary, longitudinal-sectional view of a second embodiment of the configuration according to the invention.

FIG. 3 shows a further exemplary embodiment of the invention. In this embodiment, an annular groove 15a in the first groove surface 8 leads into the radial gap 10. The radial gap 10 at the first groove surface 8 is blocked to prevent a throughflow of oil from the chamber 12, due to the fact that the annular groove 15a is connected to a discharge 22 for discharging oil. In addition, the annular seal 14 is provided in the annular groove 15, as already explained with reference to FIG. 1. The discharge 22 is again only shown as an arrow for the sake of clarity. A line 23 connected to the annular groove 15a leads to the discharge 22, and a control valve 24 is fitted in this line 23. This control valve 24 has a controlling device 25 which controls a pressure in the annular groove 15 as a function of a pressure which is measured in the interior of the sealed casing. This ensures that the oil which has penetrated into the annular gap 10 is discharged.

Figure 4:
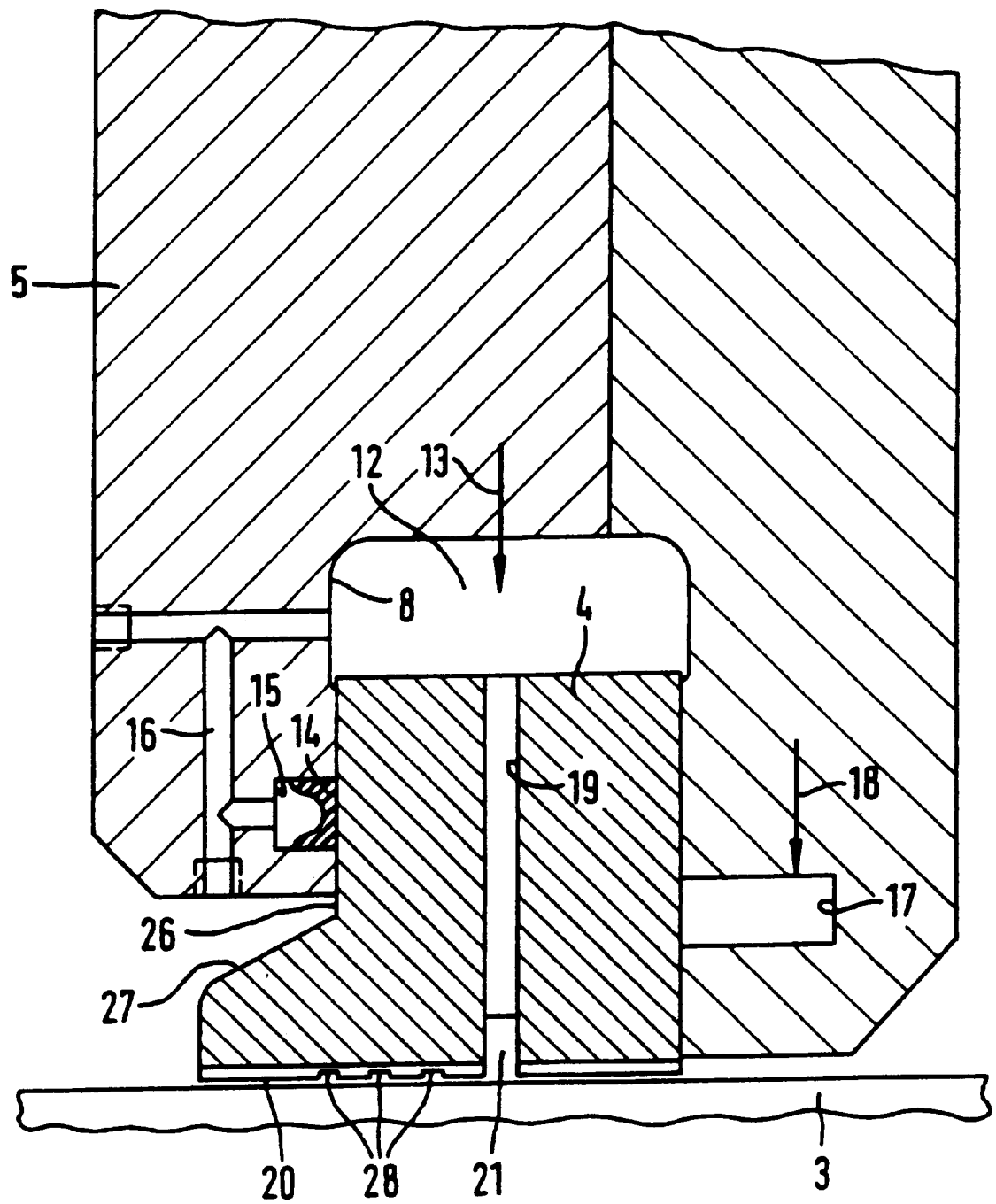
FIGS. 4 and 5 are fragmentary, longitudinal-sectional views

FIG. 4 shows a further development of the configuration in connection with the embodiment explained with reference to FIG. 1, having an annular seal 14 in an annular groove 15 of the first groove surface 8. A branch line 16 again leads from the chamber 12 to the annular groove 15. The figure shows how this branch line 16 can be made in the holder 5. To this end, three bores are necessary, of which two run out of the holder 5 and have to be closed wits non-illustrated screws. The holder 5 has a two-piece construction, which is advantageous for its manufacture.

A special feature of the embodiment according to FIG. 4 lies in the fact that the sealing ring 4 has an annular extension 27 on a surface 26 which bears directly against the first groove surface 8. The annular extension 27 extends the sealing surface 20 between the sealing ring 4 and the shaft 3. In this way, the outflow of oil along the sealing surface 20 is limited, which further reduces the accumulation of oil laden with hydrogen.

As a further special feature, the sealing surface 20 has a channel 28 helically encircling it between the annular groove 21 and the surface 26. The rotating shaft 3 gives the oil located in the channel 28 an impulse directed along the shaft 3. The impulse is directed towards the annular groove 21 given an appropriate orientation of the channel 28 and accordingly likewise limits an outflow of oil along the sealing surface 20.

Figure 5:
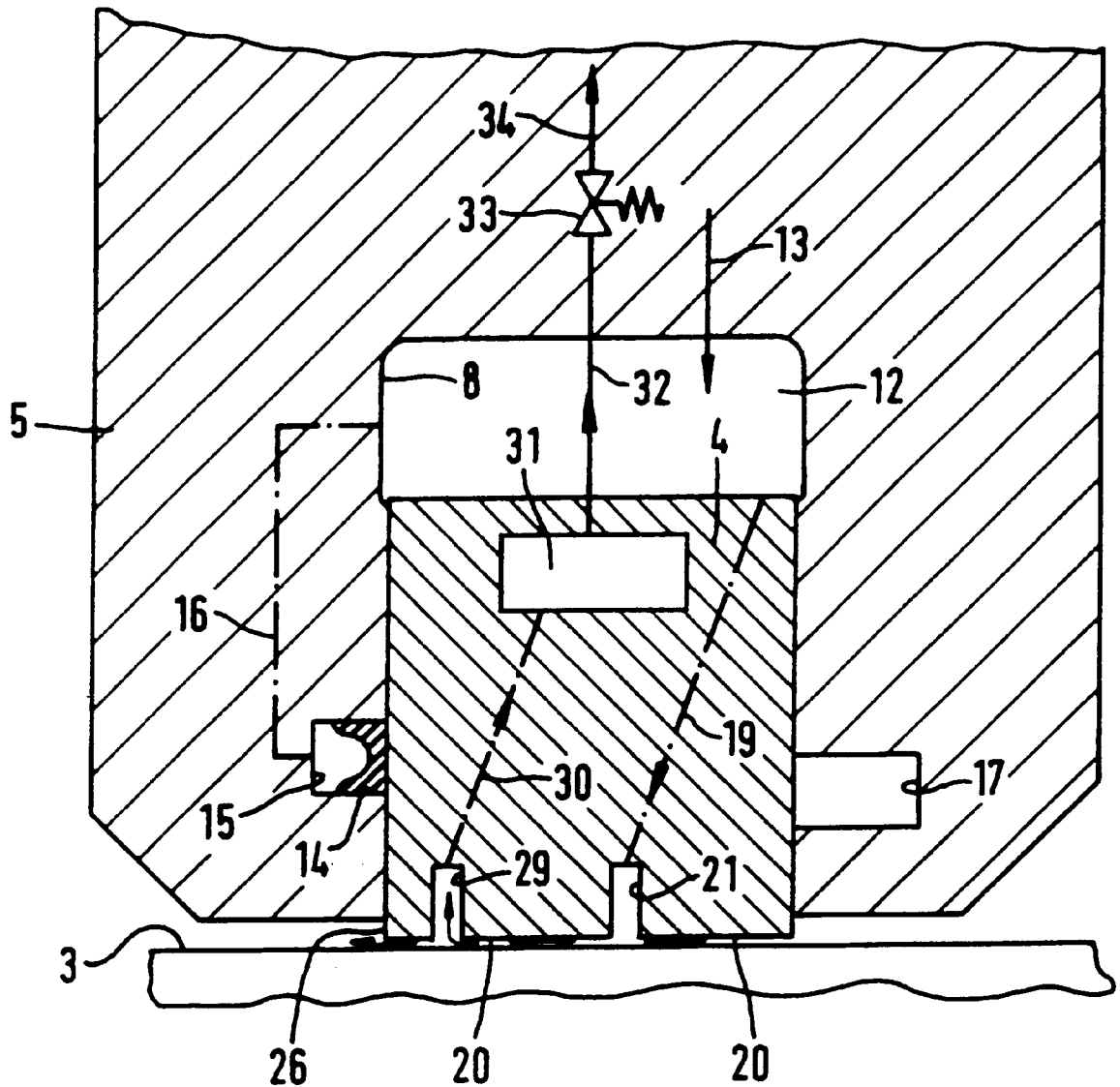

FIG. 5 shows an embodiment in which there is again an annular seal 14 between the first groove surface 8 and the sealing ring 4. The annular seal 14 is inserted into the annular groove 15 and is acted upon by pressure from the chamber 12 through the branch line 16. The sealing ring 4 again has a first annular groove 21 in its sealing surface 20 facing the shaft 3. Oil is admitted from the chamber 12 through the line 19 to the first annular groove 21. In addition, there is a second annular groove 29 in the sealing surface 20. The second annular groove 29 lies between the first annular groove 21 and the surface 26 of the sealing ring 4 facing the first groove surface 8. Oil which has flowed out of the annular groove 21 along the sealing surface 20 can enter this second annular groove 29 and is directed from the second annular groove 29 along a line 30 into a preferably annular collecting chamber 31 in the sealing ring 4. In addition, a line 32 leads from the collecting chamber 31 through the chamber 12 and through a control valve 33 to a discharge 34 which applies a certain negative pressure to the collecting chamber 31 and therefore provides for a desired removal of the oil from the sealing surface 20 into the collecting chamber 31. The oil delivered into the collecting chamber 31 has heated up considerably at the sealing surface 20 and it transfers this heat from the collecting chamber 31 to the sealing ring 4. The sealing ring 4 can thereby expand and thus adapt itself to a diameter of the shaft 3 that is changed by thermal stress. This enables the sealing ring 4 to be adapted with a precision that was not possible heretofore to the shaft 3 which is expanding as a result of thermal stress. A considerable advantage is that the sealing ring 4 can be adapted to the shaft 3 with a smaller gap than was possible heretofore, since it can expand in synchronism with the shaft. A further advantage of the configuration according to FIG. 5 lies in the fact that the sealing ring 4 can heat up more uniformly than heretofore. It therefore has less of a tendency than heretofore to form a mechanical stresses due to different thermal expansions, which is advantageous for achieving a long service life. Oil flow in the direction of the wall 2 can be kept very small by the formation of a very narrow gap between the shaft 3 and the sealing ring 4, so that blocking of the radial gap 10 may also be dispensed with depending on requirements.

Figure 6:
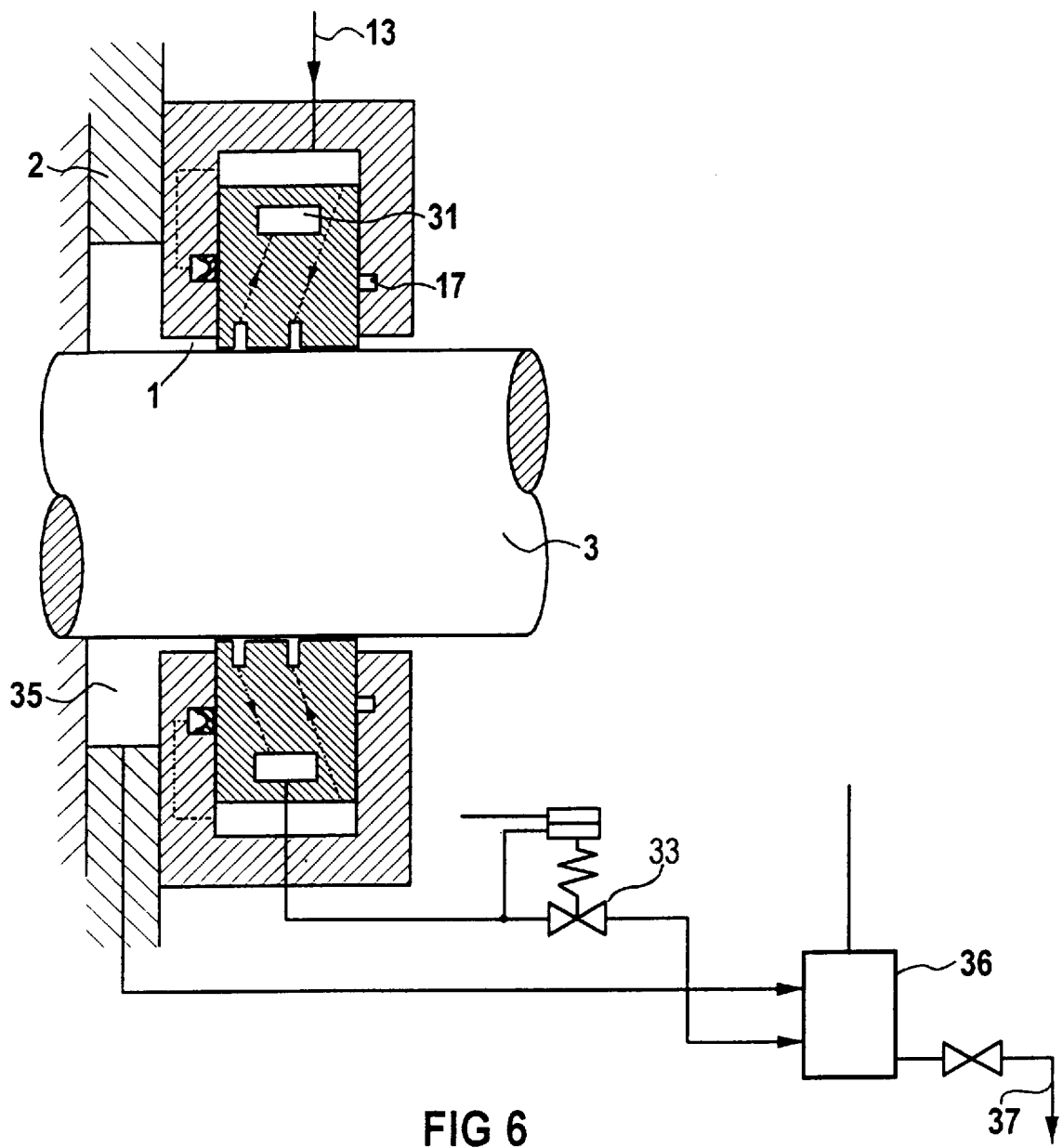
FIG. 6 is a longitudinal-sectional view, showing further developments of the invention in combination with the first embodiment.

FIG. 6 shows the exemplary embodiment according to FIG. 5 in a wider context. In this case, the leadthrough gap 1 to be sealed, the holder 5 and the wall 2 form a prechamber 35 into which oil flowing out of the sealing ring 4 and possibly laden with hydrogen is directed. This oil is directed with the oil flowing into the collecting chamber 31 into a gas-removal device 36. The oil which is cleaned therein is returned through a feedback 37 into a non-illustrated oil tank from where the oil is fed again through the feed 13 into the sealing ring 4. An apportioning of the partial oil quantity flowing in the direction of the prechamber 35 is set by a control valve 33 disposed between the cleaning device 36 and the collecting chamber 31.

All of the illustrated configurations are intended for use in sealing systems 2, 3, 4, 5, 13, 17, 22, 34 which in each case provide only a single circuit 13, 18, 19, 22, 23, 24, 30, 33, 34 for the oil. Although this circuit may branch off, for example into the feeds 13 and 18, it treats the oil as a whole.

I claim:

1. In a configuration for sealing a leadthrough gap between a wall and a shaft passing through the wall for rotation relative to the wall, the improvement comprising:

a sealing ring having a sealing surface facing the shaft to be passed through said sealing ring, said sealing ring containing at least one line;

a holder to be firmly connected to the wall, said holder having a cylindrical recess, a groove opening into said cylindrical recess and defining a first groove surface and a second groove surface for holding said sealing ring between said surfaces, said first groove surface having an annular groove, and a chamber surrounding said sealing ring, said chamber to be filled with oil remaining in said groove and directed out of said chamber through said at least one line to said sealing surface;

an annular seal held in said an annular groove; and a branch line communicating between said annular groove having said annular seal and said chamber, said annular seal and said branch line cooperating to prevent oil from flowing between said sealing ring and said holder.

2. The configuration according to claim 1, wherein said annular seal has a material with a low coefficient of friction.

3. The configuration according to claim 2, wherein said material with a low coefficient of friction is polytetrafluorethylen.

4. The configuration according to claim 1, wherein said sealing ring has a further annular groove in said sealing surface, and said at least one line leads into said further annular groove.

5. The configuration according to claim 4, wherein said sealing ring has a surface directly facing said first groove surface, and said sealing surface has a channel helically encircling said sealing surface between said annular groove and said surface directly facing said first groove surface.

6. The configuration according to claim 5, wherein said surface of said sealing ring directly facing said first groove surface has an annular extension extending said sealing surface.

7. The configuration according to claim 1, wherein said second groove surface has an annular groove for receiving oil.

8. The configuration according to claim 1, including a discharge connected to said annular groove for discharging oil from a radial gap between said sealing ring and said holder.

9. The configuration according to claim 1, wherein the wall, the shaft, said sealing ring and said holder are part of a sealing system of an electrical machine.

10. The configuration according to claim 1, wherein the wall, the shaft, said sealing ring and said holder are part of a sealing system of a turbogenerator filled with hydrogen.

11. The configuration according to claim 9, wherein the sealing system has a single circuit for the oil.

12. The configuration according to claim 10, wherein the sealing system has a single circuit for the oil.

13. In a configuration for sealing a leadthrough gap between a wall and a shaft passing through the wall for rotation relative to the wall, the improvement comprising:

a sealing ring having a sealing surface facing the shaft to be passed through said sealing ring, said sealing ring containing at least one line; and a holder to be firmly connected to the wall, said holder having a cylindrical recess, a groove opening into said cylindrical recess and defining a first groove surface and a second groove surface for holding said sealing ring between said surfaces, and a chamber surrounding said sealing ring, said chamber to be filled with oil remaining in said groove and directed out of said chamber through said at least one line to said sealing surface;

said sealing ring having a collecting chamber disposed within and surrounded by said sealing ring, a surface directly facing said first groove surface, and a discharge line disposed between said at least one line and said surface directly facing said first groove surface, said discharge line connected from said sealing surface to said collecting chamber for admitting oil to said collecting chamber.

14. The configuration according to claim 13, wherein said sealing ring has an annular groove in said sealing surface, and said discharge line leads from said annular groove.

15. The configuration according to claim 13, including an oil discharge to be connected to said collecting chamber.

16. The configuration according to claim 13, wherein said sealing ring has an annular groove in said sealing surface, and said at least one line leads into said annular groove.

17. The configuration according to claim 16, wherein said sealing surface has a channel helically encircling said sealing surface between said annular groove and said surface of said sealing ring directly facing said first groove surface.

18. The configuration according to claim 13, wherein said surface of said sealing ring directly facing said first groove surface has an annular extension extending said sealing surface.

19. The configuration according to claim 13, wherein said second groove surface has an annular groove for receiving oil.

20. The configuration according to claim 13, wherein said first groove surface has an annular groove, and a discharge is connected to said annular groove for discharging oil from a radial gap between said sealing ring and said holder.

21. The configuration according to claim 13, wherein the wall, the shaft, said sealing ring and said holder are part of a sealing system of an electrical machine.

22. The configuration according to claim 13, wherein the wall, the shaft, said sealing ring and said holder are part of a sealing system of a turbogenerator filled with hydrogen.

23. The configuration according to claim 21, wherein the sealing system has a single circuit for the oil.

24. The configuration according to claim 22, wherein the sealing system has a single circuit for the oil.

* * * * *